July 12, 1927.                                                                            1,635,178
R. A. FEISS
LINED VENT FOR UNLINED OR PARTLY LINED GARMENTS AND METHOD OF MAKING IT
Filed Feb. 10, 1923        3 Sheets-Sheet 1
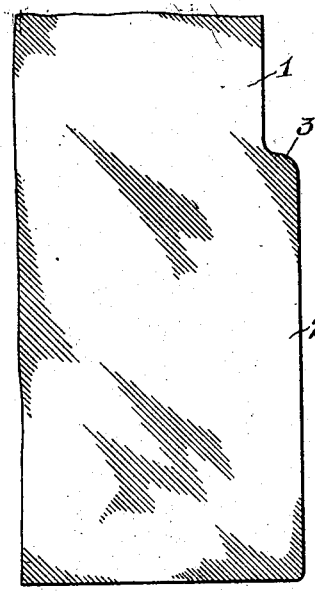
FIG. I.
FIG. II.
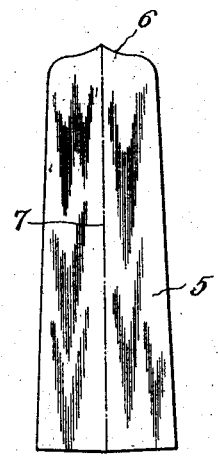
FIG. III.
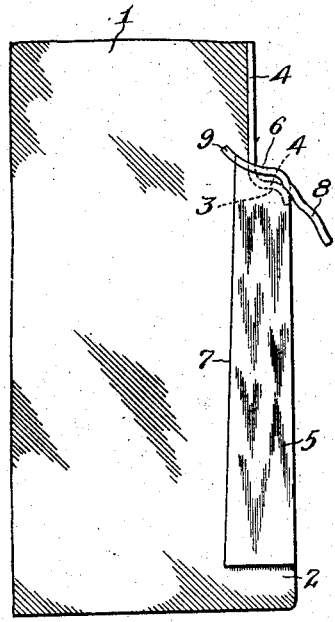
FIG. VI.
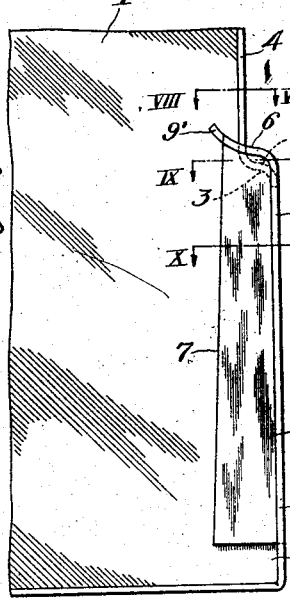
FIG. VII.
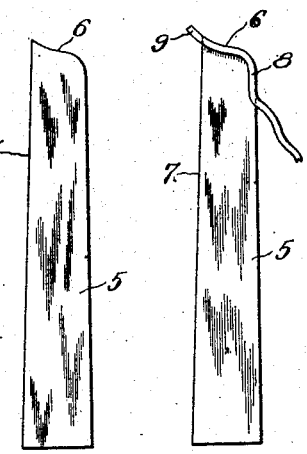
FIG. IV.   FIG. V.
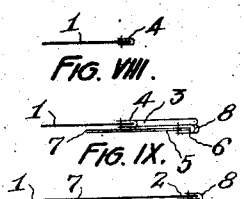
FIG. VIII.
FIG. IX.
FIG. X.
INVENTOR:
Richard A. Feiss
By his Atty.

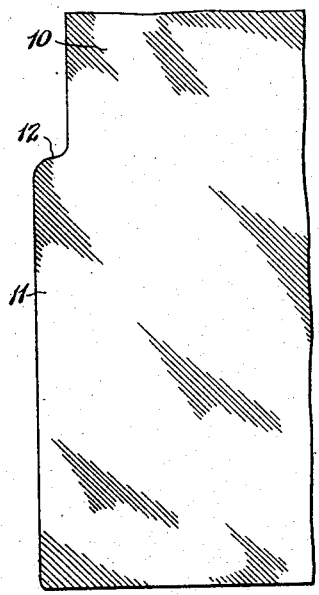
FIG. XI.
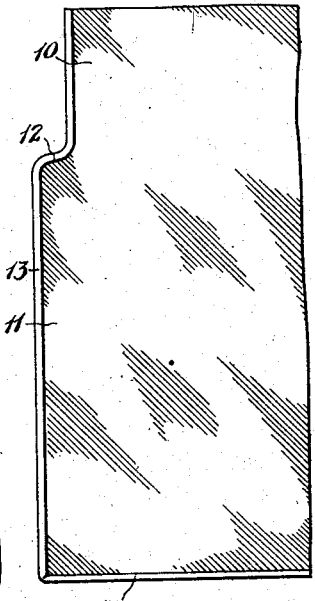
FIG. XII.
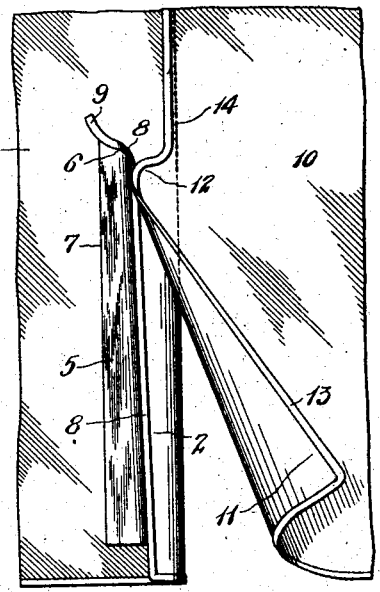
FIG. XIII.
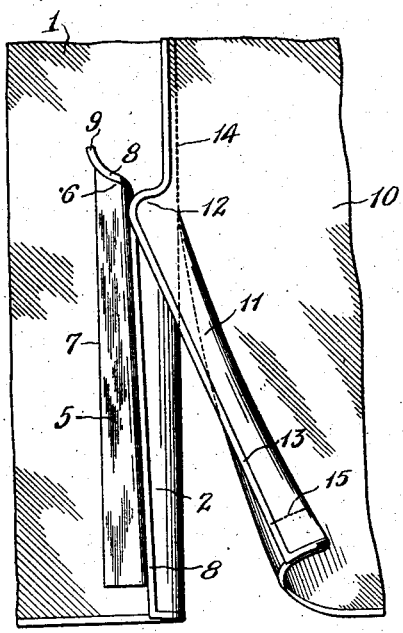
FIG. XIV.
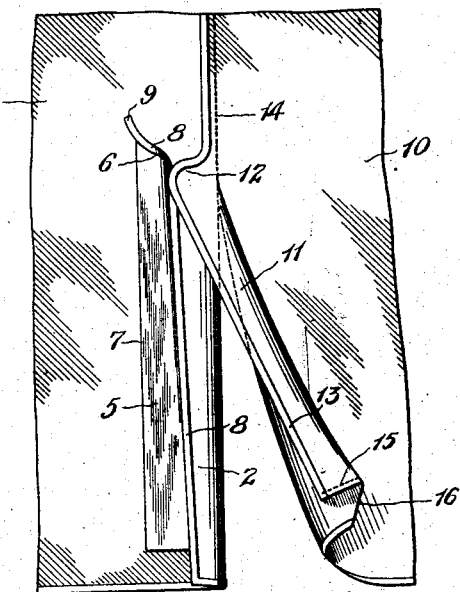
FIG. XV.

July 12, 1927.
R. A. FEISS
1,635,178
LINED VENT FOR UNLINED OR PARTLY LINED GARMENTS AND METHOD OF MAKING IT
Filed Feb. 10, 1923  3 Sheets-Sheet 3
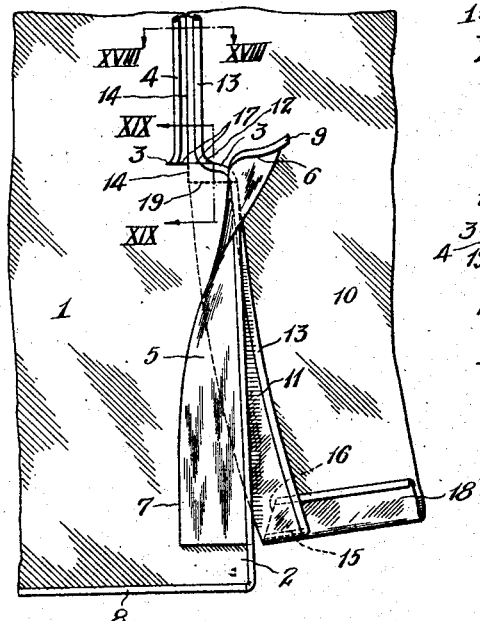
Fig. XVII.
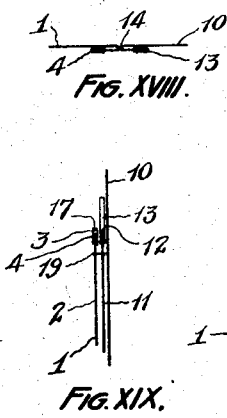
Fig. XVIII.
Fig. XIX.
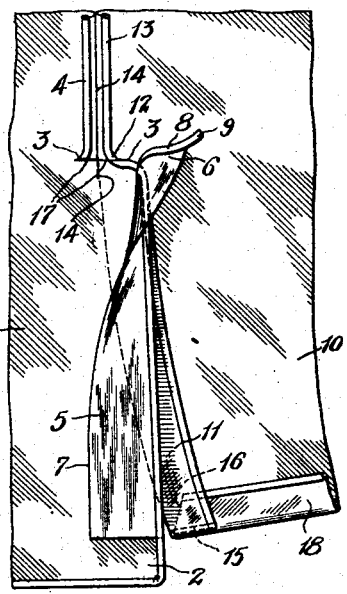
Fig. XVI.
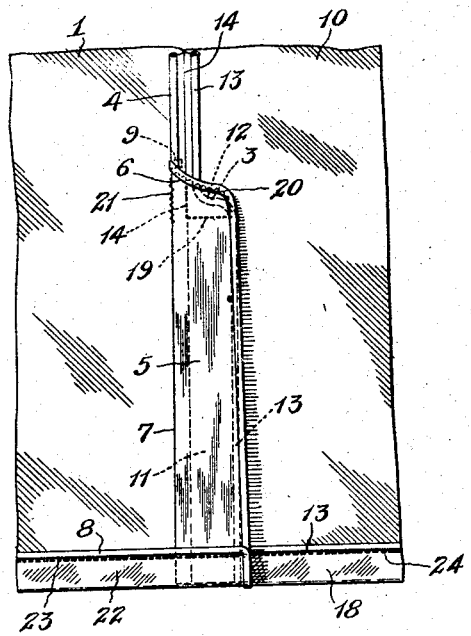
Fig. XX.
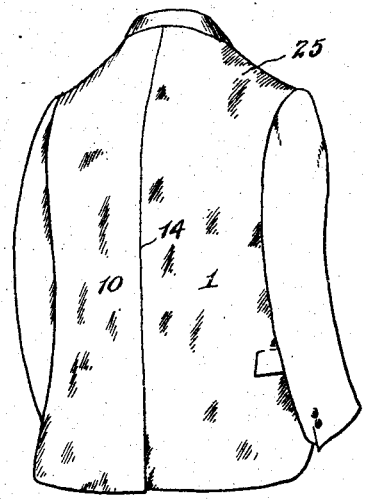
Fig. XXI.
INVENTOR:
Richard A. Feiss
By his Atty.

Patented July 12, 1927.

1,635,178

UNITED STATES PATENT OFFICE.

RICHARD A. FEISS, OF CLEVELAND, OHIO, ASSIGNOR TO THE JOSEPH & FEISS CO., OF CLEVELAND, OHIO.

LINED VENT FOR UNLINED OR PARTLY-LINED GARMENTS AND METHOD OF MAKING IT.

Application filed February 10, 1923. Serial No. 618,345.

My invention relates to a lined vent for unlined or partly lined garments as well as to the method of making the vent.

My object has been generally to improve upon a garment vent construction. Supposedly new features are:

The use of an extra lining piece in half lined, quarter lined or unlined coats.

The doubling over of such an extra lining piece to supply the desired added stiffness and reenforcement of the vent flap.

To insure a neat and trim hang of the vent.

The various steps of performing the method I believe to be new are, in sequential order, as follows:

1—Cutting the material for the right half back.

2—Binding the mid back seam of the right half back from the top of its vent and around the curved top of the vent extension to a fraction of an inch therebelow.

3—Cutting the vent lining piece.

4—Folding the vent lining piece.

5—Running binding idly through a binding machine so that the binding is applied with a free extension at one end and follows the top edge of the vent lining piece.

6—Laying the right half back below the vent lining piece and both into the jaw of the binding machine with the top of the vent lining piece projecting a fraction of an inch above the top of the vent projection of the half back.

7—Binding the two pieces together down to the bottom of the coat material and continuing the binding across the bottom of the particular half back and up its opposite side to the armhole.

8—Cutting the left half back of the garment.

9—Binding the left half back from the top of its mid back portion downwardly, around its bottom edge and up to the other armhole.

10—Laying the two half backs face to face and curve to curve (the lining piece being left outside), sewing the mid back seam a fraction of an inch from its edge commencing at the top and continuing straight down to a fraction of an inch below the beginning of the curve at the top of the vent projection and then making the usual tack at the bottom of the seam.

11—Seaming back the bottom of the left half back parallel with the bottom along the full width of the vent.

12—Trimming off the material above the bottom seam along a line parallel thereto and trimming off the outside of the material at an angle.

13—Laying the garment pieces back to back at the vent with the wrong side of the pieces up, opening up the mid back seam by pressing, notching the right half back at the concave curve where it joins the vent projection to a point as far as the seam and then turning the left vent right side out at the bottom and pressing both it and the right vent.

14—Clipping off the binding extension to leave a fraction of an inch, superimposing the vents perfectly flat and felling the vents together crosswise commencing at the bottom of the seam.

15. Felling around the curve of the vent lining piece from underneath and by hand, joining the vent lining piece to the left half back and across the mid back seam to the edge of the binding, turning the extension of the binding under the right side of the mid back seam and felling the right side of the vent lining piece to the right half back down a sufficient distance to cover the laminated parts within, preparatory to turning up and basting the bottom of the right half back to correspond with the turn-up seam of the left half back.

16—Felling the bottom turn-up of the right vent across the latter and down along its edge, felling the binding edge of the left vent from top to bottom and felling the turn-up at the bottom of the left half back.

Adverting to the drawing:

Figure I is a broken plan view of the right half back suited to the manufacture of a sack coat and fashioned with a vent flap.

Figure II is a corresponding view showing a portion of the edge supplied with a binding.

Figure III is a plan view of a vent lining piece cut with symmetrical halves.

Figure IV is a plan view of the lining piece folded along a middle line.

Figure V is a view corresponding to Figure IV with binding applied to a certain portion of its edge and with free projecting ends.

Figure VI is a plan view showing the vent lining piece as illustrated in Figure V laid in proper position over the right half back as the latter is illustrated in Figure II.

Figure VII is a view corresponding to Figure VI showing the vent lining piece attached to the right half back by continuing the binding down to and around the bottom of the half back.

Figure VIII is a section on line VIII—VIII of Figure VII.

Figure IX is a section on line IX—IX of Figure VII.

Figure X is a section on line X—X of Figure VII.

Figure XI is a broken plan view of the left half back of the coat likewise provided with a vent extension or flap.

Figure XII is a corresponding view of the left half back with the binding applied along its middle edge and around its bottom edge.

Figure XIII is a view showing the two half backs seamed together down to the top of their vents.

Figure XIV is a view corresponding to Figure XIII showing the bottom of the left half back vent seamed.

Figure XV is a view corresponding to Figure XIV showing a portion of the left half back vent clipped off along a diagonal line.

Figure XVI is a perspective view showing the right half back notched back near the top of the concave curve at the junction of its vent flap to the line of the middle back seam and also showing the lower edge of the left half back turned inside out.

Figure XVII is a part plan view and part perspective view showing the fold of the left half back and the flap of the right half back stitched together along a line substantially at right angles to the mid back seam and with the projecting end of the binding partially clipped off.

Figure XVIII is a section on line XVIII—XVIII of Figure XVII.

Figure XIX is a section on line XIX—XIX of Figure XVII.

Figure XX is a plan view showing the vent lining laid in proper position and supplied with felling stitches securing it along two edges after the terminal projection of the binding has been turned under one of the mid-back seam strips. This view also shows the right half back folded up and the bottom folds of both half backs felled.

Figure XXI is a perspective view of a finished coat embodying my invention as viewed from the rear.

The drawings exemplify the application of the principles of my invention to a sack coat the middle back of which is customarily fashioned with a vent. My preferred construction employs a pair of half backs one of which is supplied, as a portion of the vent construction, with a fold; whereas the other is supplied, as a portion of the vent construction, with a flap adapted to overlie the fold of the other half back and which flap is the only portion of the back which is to be lined.

Stitching will be illustrated in the drawings by short dots. The concealed edges of the cloth will be indicated by the usual dotted lines.

A right half back 1, the inside of which is viewed in Figure I, is fashioned at its lower portion with a lateral extension or vent flap 2 the top of which has a curved edge 3. In Figure II the right half back is shown upon the completion of the first step of my method, it having been supplied along the upper part of its middle line edge and around the curved edge 3 with binding 4. A vent lining piece 5 is cut to the shape shown in Figure III to include two symmetrical inverse curves 6 at one end which will conform to each other when the lining piece is folded along a longitudinal middle line 7 as illustrated in Figure IV. Next, the lining piece has its two curved edges 6 enclosed within a portion of a strip of binding 8 of indeterminate length and in such a manner that one end of the binding projects at 9 some distance beyond the uppermost corner of the lining piece. The projecting extension 9 constitutes one of the features of my invention and its purpose will be hereinafter explained. The other end of the binding 8 is shown broken away in Figure V and is to be applied at a later stage of manufacture as will be presently described. The folded and partly bound lining piece is then laid upon the flap 2 in the position shown in Figure VI, so that the curved top of the vent lining piece is disposed a fraction of an inch above the similar curve 3 preparatory to inserting both the flap 2 and the lining piece into the jaw of the binding machine which latter is then employed to continue the application of the binding 8 so as to enclose the two upright edges of the lining piece 5 and the upright edge of the flap 2 all three of which are held in alinement. The application of the binding 8 is also continued down beyond the lower edge of the lining piece, around the bottom of the half back 1, as shown in Figure VII, and thence up to its armhole, not shown.

The inside view of the left half back 10 shown in Figure XI discloses at the left lower portion an extension 11 merging with the middle back line over the inversely curved line 12. Binding 13 is then supplied down along the middle back line along the curved edge 12 and down around the bottom and up to its armhole, not shown. The two half backs are now laid face to face and curve to curve, with the lining piece held aside, as shown in Figure XIII, and the mid back seam 14 made, commencing at the top of the two back pieces to a fraction of an inch below the top of the curved edges 3 and 12. A tack is also made at the lower end of the seam in a manner common to the art. The construction of the seam 14 provides a pair of comparatively narrow seam bordering strips on the half backs 1 and 10 respectively. The bottom of the left half back is then seamed back parallel with the lower edge for the full width of the extension 11 whereby to form a fold, the seam stitching being designated by the numeral 15 in Figure XIV. Then the left half back is trimmed off along the diagonal line 16 as may be seen in Figure XV.

The two half backs are now laid out flat, the mid back seam laid open by pressing, the right half back notched by making an incision 17 which commences near the top of the curved edge 3 and extends as far as the line of the seam 14, and the fold of the half back is turned right side out at its bottom preparatory to pressing the flap 2 thereupon. Directing attention to Figure XVII it will be observed that the lower edge of the left half back has been folded up at 18 and a crosswise extending stitch 19 been supplied to sew together the upper end of the flap 2 and the upper end of the fold 11. The stitching 19 commences at the bottom of the seam 14 and extends at substantially right angles thereto to the bottom of the curved edges 3 and 12. A part of the extension 9 is then clipped off so that it about corresponds in length with the width of the mid seam bordering strip. Thereafter, the two-ply lining is laid flat against the flap 2 and the extension 9 of its binding bent around and underneath the binding 4 on the seam bordering strip of the right half back 1, following which, one felling stitch 20 is made along the laminated curved upper edges 3 and 12, and another felling stitch 21 applied to the upper end of the folded edge of the lining thereby concealing the manner of construction and securely sewing the parts together. The bottom of the right half back is then folded up at 22 to correspond to the fold 18 of the left half back and then felling is accomplished with stitches 23 and 24 to secure the folds 22 and 18 respectively. A vent construction embodying the inventions described will show no exterior stitches in the back of the finished coat 25 below the bottom of the mid back seam but the flap in the right half back is securely affixed to the fold in the left half back and the upper corner of the flap of the right half back reenforced by the manner of turning under the end of its binding. The folded lining piece is securely bound and supplies the requisite weight to insure the trimness of hang so desirable in a garment vent.

I claim:—

1. A garment provided with a vent flap and a folded lining piece approximately conforming in size and shape to said flap, with its loop edge mainly free and with its two longitudinal edges affixed to the edge of said flap.

2. A garment provided with a pair of partway seamed half backs, one of the seam-bordering portions of one half back being partially severed so as to be adapted to be flapped across said seam line, a folded lining piece in its entirety juxtaposed to one side of said flapped-over strip, and felling stitches for fastening together juxtaposed edges of said lining piece and the edge of said flapped strip and for securing the upper part of the composite flap to the same half back.

3. A garment comprising a pair of half backs seamed together along a given line to leave inside seam-bordering strips, one of said half backs being provided with a flap, and a finishing element for said flap, said element including a projecting end doubled under one of said seam-bordering strips.

4. A garment comprising a pair of half backs seamed together along a given line to leave inside seam bordering strips, one of said half backs being provided with a flap projecting across said seam line and a lining structure covering said flap, said structure including a projecting end doubled under one of said seam bordering strips and stitching for affixing said structure to the other seam-bordering strip.

5. A garment comprising the combination of a pair of half backs seamed together for a certain distance, one of said half backs including a fold beyond one end of said seam and the other half back including a flap adapted to overlie said fold and a seam bordering strip, stitching securing said fold and flap together, and lining stitched both to said flap and to said seam bordering strip.

6. A garment comprising a pair of half backs seamed together along a portion of adjoining edges to form seam-bordering strips, one of said seam-bordering strips being notched at the lower end of the seam line and enlarged below the notch to form a flap adapted to extend across the seam line, said flap and the seam-bordering strip from which it was partially severed lying flat on opposite sides of said seam line, and two-ply lining covering said flap and the lower end of said strip and stitched to each.

7. A garment comprising a pair of half backs seamed together along a portion of adjoining edges to form seam-bordering strips, one of said seam-bordering strips being notched at the lower end of the seam line and enlarged below the notch to form a flap adapted to extend across the seam line, said flap and the seam-bordering strip from which it was partially severed lying flat on opposite sides of said seam line, stitching securing said fold and flap and lining together, and binding for the edges of said flap and lining including a projecting upper end sewn around the lower end of said strip adjacent to its notch.

8. A garment comprising a pair of half backs seamed together along a portion of adjoining edges to form seam bordering strips, one of said seam-bordering strips being notched and enlarged below to form a flap, the other strip being enlarged and folded back, said flap adapted to overlie said fold, and lining structure covering said flap and the lower end of said strip and stitched to one side of one and to the other side of the other.

9. A garment comprising a pair of half backs seamed together to provide comparatively narrow seam-bordering strips, said seam terminating some distance from the ends of the parts along said seam line, one of said strips being cut crosswise to permit its lower end to be flatly laid against the lower end of the seam-bordering strip on the other half back, said partially severed lower strip end carrying an extension sewn to the end of the upper portion of said partially severed seam bordering strip.

10. A garment comprising a pair of half backs seamed together to provide comparatively narrow seam-bordering strips, said seam terminating some distance from the ends of the parts along said seam line, one of said strips being cut crosswise to permit its lower end to be spread across said seam and laid against the lower end of the seam-bordering strip on the other half back, folded lining, binding for securing said lining to said lower end which extends across the seam line, the upper end of said binding being inserted beneath and sewn to the lower end of the upper portion of said partially severed seam bordering strip.

11. A garment provided with a seamed back portion and a vent flap, a folded lining piece having two edges conforming to an edge of said flap and means for enclosing the conforming edges of said lining piece and the edge of said flap, said means being additionally secured to said back portion.

Signed by me, this 16th day of January, 1923.

RICHARD A. FEISS.